United States Patent
Spector (10) Patent No.: US 8,533,108 B2
(45) Date of Patent: Sep. 10, 2013

(54) COMPUTERIZED METHOD AND SYSTEM FOR PROVIDING A CONTINUING EDUCATION CREDIT CARD

(76) Inventor: Donald Spector, New York, NY (US)

(*) Notice: Subject to any disclaimer, the term of this patent is extended or adjusted under 35 U.S.C. 154(b) by 360 days.

(21) Appl. No.: 12/388,248

(22) Filed: Feb. 18, 2009

(65) Prior Publication Data

US 2009/0240573 A1 Sep. 24, 2009

Related U.S. Application Data (60) Provisional application No. 61/145,752, filed on Jan. 20, 2009, provisional application No. 61/037,611, filed on Mar. 18, 2008.

(51) Int. Cl.
*G06Q 10/00* (2012.01)
*G06Q 20/00* (2012.01)
*G06Q 30/00* (2012.01)
*G06Q 50/00* (2012.01)

(52) U.S. Cl.
USPC .......................................................... 705/38

(58) Field of Classification Search
CPC ....... G06Q 10/00; G06Q 20/00; G06Q 30/00; G06Q 50/00
USPC .......................................................... 705/38
See application file for complete search history.

(56) References Cited

U.S. PATENT DOCUMENTS

| | | | |
|---|---|---|---|
| 3,852,571 A | 12/1974 | Hall et al. | 235/379 |
| 4,172,552 A | 10/1979 | Case et al. | 235/380 |
| 5,056,019 A | 10/1991 | Schultz et al. | 705/14 |
| 6,006,205 A | 12/1999 | Loeb et al. | 705/34 |
| 2001/0047336 A1* | 11/2001 | Maycock et al. | 705/44 |
| 2001/0051917 A1* | 12/2001 | Bissonette et al. | 705/39 |
| 2003/0083933 A1* | 5/2003 | McAlear | 705/14 |

OTHER PUBLICATIONS

Bank of America, Credit Card Processing Basics, on the web site of Bank of America at www.bankofamerica.com/small_business/merchant_card_processing/index.cfm?template=card_processing_basics as viewed on Feb. 6, 2009 at 7:07 p.m. EST, 3 pages.

(Continued)

*Primary Examiner* — Daniel Felten
*Assistant Examiner* — Clifford Madamba
(74) *Attorney, Agent, or Firm* — Collard & Roe, P.C.

(57) ABSTRACT

An improved computerized method for provides credit card services by a card issuer. The improvement operates in connection with continuing education offered to a constituent of an organization. In this context, the constituent has an account with the card issuer and the improvement includes storing, in association with the account, data associated with a provider's course approved by the organization for enrollment by the constituent. It also includes processing incoming merchant charges to be posted to the account to flag any charge identified as pertaining to the approved course by the associated data and to store such charge as flagged. Finally it includes deferring billing of any flagged charge, pending settlement of such flagged charge under an arrangement with the organization.

14 Claims, 8 Drawing Sheets

(56) References Cited

OTHER PUBLICATIONS

Wikipedia, the free encyclopedia, Credit card, at http://en.wikipedia.org/wiki/Credit_card as viewed on Feb. 6, 2009 at 7:13 p.m. EST, 20 pages.

Chakravorti, et al., A Study of the Interrelated Bilateral Transactions in Credit Card Networks, Federal Reserve Bank of Chicago, 2001, available at http://papers.ssrn.com/sol3/papers.cfm?abstract_id=294510 on Feb. 7, 2009, 41 pages.

Robert M. Hunt, An Introduction to the Economics of Payment Card Networks, Federal Reserve Bank of Philadelphia, 2003, available at www.philadelphiafed.org/research-and-data/publications/working-papers/2003/wp03-10.pdf on Feb. 7, 2009, pp. 80-96.

Fast Transact, Inc., Credit Card Processing—Glossary of Terms, available at http://www.fasttransactonline.com/credit_card_glossary.htm on Feb. 7, 2009 at 12:53 p.m. EST, Feb. 7, 2009, 14 pages.

* cited by examiner

COMPUTERIZED METHOD AND SYSTEM FOR PROVIDING A CONTINUING EDUCATION CREDIT CARD

CROSS REFERENCE TO RELATED APPLICATIONS

The present application claims priority from U.S. provisional application Ser. No. 61/145,752, filed Jan. 20, 2009, and U.S. provisional application Ser. No. 61/037,611, filed Mar. 18, 2008. Each of these related applications is hereby incorporated herein by reference in its entirety.

TECHNICAL FIELD

The present invention relates to computerized systems and methods, and more particularly to computerized systems and methods for credit card services, particularly as applied to continuing education.

BACKGROUND ART

In many companies and areas with professionals—as an example nurses in many hospitals—continuing education reimbursement is built into nurses' contracts of employment. However, the mechanism of accessing this money makes the use of it more difficult, and as a result, only a small percentage of the several billion dollars allotted just for nurses is actually used. Furthermore, adding to these figures unused reimbursement amounts allocated for teachers and other professionals brings this number to tens of billions of dollars of unused monies.

As an example, in a hospital situation, a nurse might get pre-approval for a continuing education class that relates to his or her work. The money is often in the nurse's contract and the nurse therefore has a right to reimbursement. However, the money for reimbursement cannot get to the nurse, even with pre-approval, until she presents a receipt for the class, and then reimbursement might take a considerable period of time. The New York State Nurses Association currently has a continuing education reimbursement level of $2,000.00 per nurse per year in the Association's contract. However, many nurses do not have the money to lay out while awaiting payment from their employer.

Figure 1:
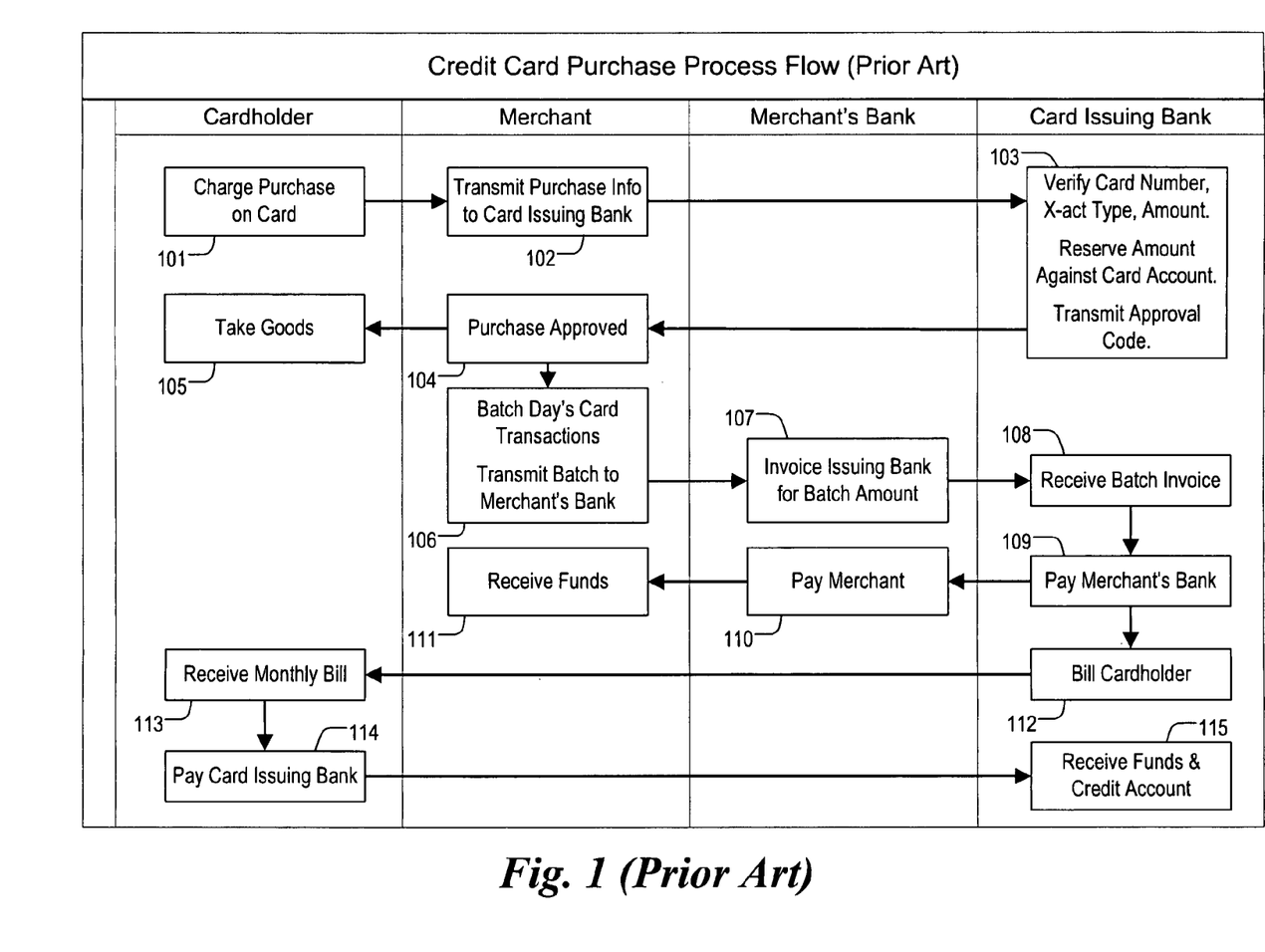
FIG. 1 is a diagram illustrating how credit cards are commonly employed in transactions.

Computerized methods and systems for providing credit card services are well known in the art. FIG. 1 illustrates how credit cards are commonly employed in transactions. Typically at least four parties are involved in a transaction involving a credit card purchase: the cardholder, the merchant, the merchant's bank, and the card issuing bank. The cardholder makes the purchase (obtaining the goods in process 105), signing a credit card charge (in process 101), which the merchant forwards to the merchant's bank, usually in a batch process (106). The merchant's bank in turn (in process 110) pays the merchant on the charge (the merchant receiving the funds in process 111) and (in process 107) forwards the charge to the card issuing bank (which receives the batch in process 108). The card issuing bank (in process 109) pays the merchant bank and debits the cardholder's credit account. The cardholder (in process 112) is billed periodically, commonly monthly, by the card issuing bank, and (in process 114) pays the card issuing bank (which receives the funds credits the account in process 115). Typically the amount received by the merchant from the merchant's bank reflects a discount for handling by the merchant's bank of its portion of the transaction, and the amount received by the merchant's bank from the card issuing bank reflects another discount for the card issuing bank's participation in the transaction.

When the charge is viewed by the merchant as substantial, the merchant may seek (in process 102) and obtain (in process 104) approval from the card issuing bank (granted in process 103) to enter into the charge transaction with the customer, and such approval provides enhanced protection against the risk that the card issuing bank will refuse to honor the cardholder's charge.

The processes described in connection with FIG. 1 are explicated and exemplified in various aspects in references including (i) a description on the web site of Bank of America at http://www.bankofamerica.com/small_business/merchant_card_processing/index.cfm?template=card_processing_basics as viewed on Feb. 6, 2009 at 7:07 p.m. EST; (ii) the Wikipedia article on "Credit card" at http://en.wikipedia.org/wiki/Credit_card as viewed on Feb. 6, 2009 at 7:13 p.m. EST; U.S. Pat. No. 6,606,205 entitled "Credit Card Billing Method and System"; (iv) Chakravorti et al., "A Study of the Interrelated Bilateral Transactions in Credit Card Networks," Federal Reserve Bank of Chicago, 2001, available at http://papers.ssrn.com/sol3/papers.cfm?abstract_id=294510 on Feb. 7, 2009; (iv) Hunt, "An Introduction to the Economics of Payment Card Networks," Federal Reserve Bank of Philadelphia, 2003, available at www.philadelphiafed.org/research-and-data/publications/working-papers/2003/wp03-10.pdf on Feb. 7, 2009; "Credit Card Processing—Glossary of Terms," available at http://www.fasttransactonline.com/credit_card_glossary.htm on Feb. 7, 2009 at 12:53 p.m. EST; U.S. Pat. No. 3,852,571 entitled "System of Transferal of Funds"; U.S. Pat. No. 4,172,552, entitled "Credit Card Processing System"; and U.S. Pat. No. 5,056,019 entitled "Automated Purchase Reward Accounting System and Method." Each of these references is hereby incorporated herein by reference in its entirety.

SUMMARY OF THE INVENTION

In a first embodiment of the invention there is provided an improved computerized method for providing credit card services by a card issuer. This method is of the type employing computerized processing of a stream of incoming merchant charges to be posted and stored as debits to a cardholder's account and to generate a bill of the posted charges on a periodic basis to the cardholders The improvement operates in connection with continuing education offered to a constituent of an organization. In this context, the constituent has an account with the card issuer and the improvement includes storing, in association with the account, data associated with a provider's course approved by the organization for enrollment by the constituent. It also includes processing incoming merchant charges to be posted to the account to flag any charge identified as pertaining to the approved course by the associated data and to store such charge as flagged. Finally it includes deferring billing of any flagged charge, pending settlement of such flagged charge under an arrangement with the organization.

In a further related embodiment, settlement of each flagged charge comprises using a settlement computer process and crediting of the account of the constituent with an amount corresponding to such flagged charge. In this embodiment, the method further includes, upon the settlement, using a billing computer process to cause billing of the amount of such flagged charge to the constituent.

With respect to this aspect of the invention in fact several implementations can be effectuated. Typically, the transaction handling would have the merchant charge generated by the provider ultimately sent to the card issuer, because the constituent charged the provider's course fee on the card issuer's credit card. The card issuer flags but does not yet post the charge for billing to the constituent's account. The provider can optionally send a duplicate charge to the organization. In this embodiment, the method includes upon settlement, receiving payment from the organization of a duplicate merchant charge issued by the provider to the organization, such payment giving rise to the crediting of the account of the constituent.

Alternatively, or in addition, the card issuer sends its own bill to the organization that tracks the merchant charge of the provider submitted to the card issuer. In this embodiment, the method includes in a second billing computer process, issuing a bill to the organization for each flagged charge, and debiting an account of the organization for an amount billed to the organization. The method also includes receiving from the organization payment of the bill to the organization, and, upon the settlement, crediting the account of the organization for such payment, such payment giving rise to the crediting of the account of the constituent.

In a further related embodiment, processing incoming merchant charges to be posted to the account to flag any charge identified as pertaining to the approved course further includes determining whether any such charge includes a portion that is not subject to funding. In such case, the method further includes, flagging only an amount of such charge excluding the portion; and separately processing the portion. In a further related embodiment, separately processing the portion includes posting the portion for current billing on the account of the constituent. Alternatively, or in addition, wherein separately processing the portion includes absorbing the cost of the portion as a reward to the constituent.

In a further related embodiment, the method also includes conditioning settlement of such flagged charge on receiving authorization from the organization to implement settlement thereof, such authorization being evidence of satisfaction by the constituent of a requirement by the organization in relation to the course.

Alternatively or in addition, in a further related embodiment, the method further includes, on receipt of a communication from the organization corresponding to disapproval of the course, automatically removing the flag from the charge and posting it to the constituent's account for billing.

In yet another related embodiment, the method further includes providing to the constituent a reward system under which identified goods or services are made available without additional charge, conditioned, however, on existence of at least one flagged charge in the account. In this embodiment, such providing includes on storing a charge as flagged, crediting an associated reward account; and appropriately debiting the associated reward account on its use for the any of the identified goods or services.

In another related embodiment, the method further includes conditioning deferring billing of a flagged charge on whether the charge would exceed a limit imposed by the organization on charges pertaining to a provider's course. This embodiment enables enforcement of a limit imposed by the organization on funding of continuing education charges.

Furthermore, in another related embodiment, the method also includes storing in a historical database a record of each flagged charge; updating the historical database to reflect any posting of each such flagged charge, any payment thereof, any communication from the organization corresponding to disapproval of the course to which such flagged charge pertains, and whether any limit on continuing education of the constituent has been exceeded In addition, the method includes retrieving information from the historical database pertaining to the constituent; and providing a report to the constituent based on the retrieved information so as to provide the constituent with a record of continuing education activity of the constituent. Providing the report optionally includes causing the retrieved information to be included in the bill on the periodic basis to the constituent.

In a further related embodiment, the method also includes storing for the constituent a target continuing education goal for a relevant interval. In addition, the method includes, on a recurrent basis, retrieving from the historical database information pertaining to the constituent's continuing education activities to date in the relevant interval, comparing such activities with the target continuing education goal, to identify performance of the constituent to date in relation to the target in such activities, to produce a comparison; and and causing communication of the comparison to the constituent. Optionally, communicating of the comparison to the constituent includes generating an e-mail to the constituent. Also optionally, comparing such activities with the target continuing education goal includes determining whether performance of the constituent to date results in any shortfall from the target, straight-on satisfaction of the target, or excess over the target.

Alternatively, in a further related embodiment, the method further includes storing in a historical database a record of each flagged charge and storing for the constituent a target continuing education goal for a relevant interval. Additionally, the method includes, on a recurrent basis, before expiration of the relevant interval, retrieving from the historical database information pertaining to the constituent's continuing education activities to date in the relevant interval, comparing such activities with the target continuing education goal, to identify any shortfall in such activities; and in the event a shortfall has been identified, causing communication to the constituent of the shortfall to alert the constituent, so that the constituent has an opportunity to repair the shortfall before expiration of the relevant interval. In a further related embodiment, causing communication to the constituent includes generating an e-mail to the constituent.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Continuing education" is any course or program offered for educational or training purposes, regardless whether or not accredited or in a degree program, and regardless whether in a professional, vocational, or academic setting, and regardless whether the course or program is offered in a class, online, by correspondence, or by other means, as long as the charge, incurred by an enrollee, for the course or program is fundable under a set of terms by an entity. Thus the definition of "continuing education" does not rule out a magazine article in a professional journal for which continuing education credit is given when the reader takes and passes an online test for which a charge is imposed.

A continuing education charge is "fundable" in the previous definition if it is, for example, subject to reimbursement by an employer to an employee under a set of terms. A continuing education charge is also "fundable" for purposes herein if it is covered, for example, as part of a loan package to a student in an educational institution; the loan package may be from the institution itself or from another private entity or a public entity. The concept of "funding" of a continuing education charge and of offering to "fund" a continuing education charge similarly apply herein to (i) a situation involving reimbursement for incurring the charge and (ii) a situation wherein the charge is being covered by a loan or scholarship from a funding source.

An "organization" is an entity offering funding, under a set of terms, for continuing education to at least some constituents associated with the entity. The organization may therefore, for example, be an employer (whose constituents may be employees or independent contractors) or an educational institution (whose constituents may be students) or a state or federal entity or a private entity providing loans or scholarships. (whose constituents may again here be students).

A "constituent" of an organization is a person receiving funding for continuing education from the organization, such as an employee or independent contractor under a company arrangement providing reimbursement for continuing education, or, a student under an arrangement with a state or federal entity or a private entity providing loans or scholarships.

A "provider" is any person or entity providing continuing education. In accordance with embodiments of the present invention, the provider herein acts as a merchant in a credit card transaction for purposes of selling its continuing education services. A person enrolled in a continuing education offering by the provider makes the purchase of the offering by making a credit card charge. This charge, as described below, in connection with certain embodiments of the present invention, is "flagged" to cause its being deferred from being posted to the account of the card holder for billing purposes.

A "card issuer" is an entity that is in the business of providing credit card services. A card issuer may be a bank, and alternatively or in addition may be an organization (as defined herein) or an affiliate of an organization.

Each of the terms "debit", "credit", and "bill", used herein as either a noun or a verb, refers not simply to an accounting concept but more specifically to a computerized implementation of the corresponding accounting concept. In particular, as indicated by references above including U.S. Pat. No. 6,606,205, U.S. Pat. No. 4,172,552, and U.S. Pat. No. 5,056,019, delivery of credit card services is heavily computerized, and it has long been within the skill of the art to employ computer processes to cause an amount to be debited or credited to a specific account and for a specific account to be billed.

Various embodiments of the present invention provide a continuing education credit card offered by a card issuer under an agreement with a provider (often a school). The card issuer issues such a card to a constituent of an organization, for example a nurse employed by a hospital. This credit card is used by the constituent to charge payment for the continuing education course, and the constituent receives a receipt that is turned in to the organization. While the organization may take time providing funding to the constituent, the provider has an arrangement with the bank to defer interest due on the card and repayment of the credit card debt until the constituent receives funding from the organization.

In some cases, for example where the nurse is having difficulties in receiving reimbursement from the organization, the bank or provider can, as a third party, demand the funds from the organization. Because the bank or provider is not an employee, the bank or provider is in a more advantageous position to demand payment than the employee. In other cases, the organization, depending on circumstances, may, for example, guarantee the payment and collection. In these cases, for example, the nurse is not responsible should reimbursement not be forthcoming. The organization might also provide insurance in this instance. These embodiments therefore allow the constituent to charge continuing education expenses without providing out-of-pocket cash or paying off the charge in installments (if reimbursement from the employer is not forthcoming), and not paying interest, in those cases where the organization is responsible, until the organization actually reimburses the constituent. In other embodiments of the invention, reimbursement checks from the organization might be directly turned over as full payment, without interest for the courses.

In other embodiments of the present invention, the problem is addressed in which in some contracts between an organization and its constituents, the organization will pay for continuing education courses but not for transportation or meals required for the constituent to take the course. Specifically, the provider might wish to operate on lower margins for the educational component, and cover transportation or meal expenses to course enrollees. However, the provider is sometimes blocked from doing so by the organization, which might insist upon a breakout of these costs and pay the provider only for course tuition. To address this problem, the card issuer may provide a unique reward program pursuant to which the card issuer offers, in connection with the continuing education card, to pay the costs of transportation and meals for the cardholder for a course purchased with the card. Therefore, for example, a course brochure that is presented to the organization might show a cost of $1,000.00 for CE contact hours, and $300.00 for transportation and meals. However, the organization would receive a bill for the continuing education course of $1,000.00. In a separate agreement between the provider and the card issuer, the provider would accept the $1,000.00 for the course and the card issuer would provide free transportation and meals through the reward program. This is an important consideration to the organization in allowing constituents to take continuing education courses who may find it difficult to pay for the transportation and meals associated with attending a course. For the provider, it might reduce the profit margins of the continuing education course, but serves as a reward system for the use of the card.

While the examples presented above for providing a continuing education credit card are directed to a constituent of an organization taking continuing education courses (labeled as such) offered by a provider, the card can also be used for other types of educational courses offered in other types of educational settings, including college courses. (Our definition above of "continuing education" herein includes such other courses.) For example, the card may allow a college the ability to provide certain incentives for early enrollment, and provides a third party interface for many non-profits that do not wish to have to collect tuition-related debts from their students.

It also allows students to "automatically" re-enroll in courses, especially those students with state and federal grants and loans, and can forgive credit card interest in return for the college's knowing what their enrollment will be in the coming semester. In this context, the college plays the role of the "organization" defined above, and the student is the "constituent". A student loan, for example, from a government agency, constitutes "funding" from a funding source. In this context, the card issuer defers posting the charge for a course pending receipt of funds on the loan to the student, and the loan or a portion of it may be directed to the card issuer, so that, on receipt of these funds by the card issuer, the charge is posted and billed to the student. The student-college context may differ from the employee-employer context in another manner, because the course funding that is payable for the benefit of the student does not necessarily come from the organization (that is, the college) and may come from a third party, such as a governmental agency. Nevertheless, in a number of contexts, the card issuer is a suitable intermediary among the third party funding source, the student, and the college (which here is both the provider and the organization).

The credit card may also provide rewards redeemable, for example, at the college bookstore for much earlier enrollments, thereby facilitating scheduling of events and classes.

It is believed that the continuing education credit card exemplified by various embodiments of the present invention has several unique and valuable features, including the following:

The card allows for a constituent to have a charge receipt to submit to an organization for funding without requiring out-of-pocket expenditures by the constituent, or having to pay card interest or penalties, should the organization not be forthcoming in funding the constituent for continuing education expenses.

The card can provide information on each credit card billing statement that provides personalized information regarding the amount of CE credits the nurse gets, the amount of money she has left from her contract and certain other relevant financial data.

The card provides an opportunity for a constituent to gain free transportation and food through a cardholder reward program when a provider is willing to discount the cost of the courses, while showing the employer the breakout of the costs and attributing the costs of travel and meals to the reward system of the card.

The card can provide for an early registration system for schools that face the problem of last minute registrations caused by delays in students receiving private, state, local or federal grants and loans.

The card can provide a buffer between the student and the institution, which may be politically important for the institution when card debt goes into collection. It is more likely that an issuer bank can collect on the debt, since, even though the bank may have recourse to the provider or school, the bank feeds into credit bureaus directly and students cannot have recourse to the institution.

Figure 2:
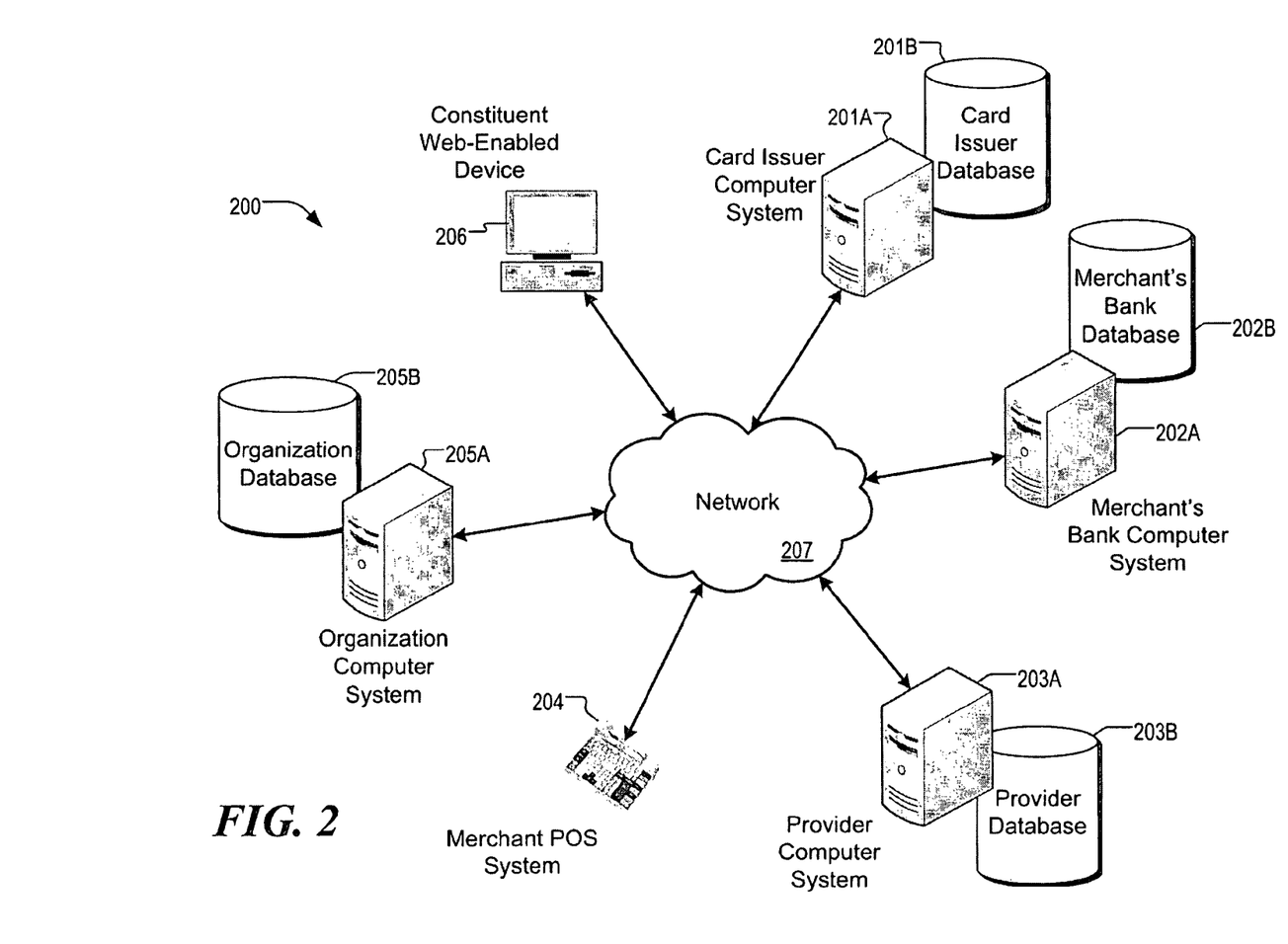
FIG. 2 is a block diagram of a computer network in which a computerized method for providing a continuing education credit card operates, in accordance with an embodiment of the present invention.

FIG. 2 is a block diagram of a computer network in which a computerized method for providing a continuing education credit card operates, in accordance with an embodiment of the present invention. The computer network of FIG. 2 includes card issuer computer system and database 201, merchant's bank computer system and database 202, provider computer system and database 203, merchant point-of-sale (POS) system 204, organization computer system and database 205, and a constituent web-enabled device 206. These computer systems communicate with each other over a network 207.

Card issuer computer system 201A and associated database 201B comprise the computer systems of the card issuer (which may be a bank) that issues a continuing education credit card to a constituent of the organization. Database 201B contains information related to the cardholder's account, including information related to account identification, such as cardholder personal information, information related to the cardholder's employer or organization, and information related to provider courses that the cardholder will take, or is taking. Database 201B also includes information related to card transactions, such as merchant charges to the account, credits to the account, and account balances and credit limits, including corresponding reward account balances. Card issuer computer system 201A executes a series of processes, including those described in connection with FIG. 1, as part of providing continuing education credit card services in accordance with an embodiment of the invention herein. Additional processes executed on card issuer computer system 201A will be described in detail below, in relation to FIGS. 3-6.

Merchant's bank computer system 202A and associated database 202B comprise the computer systems of the bank that holds business accounts of the merchant. Database 202B contains business account information for the merchants it services. One process that executes on merchant's bank computer system 202A is periodically transmitting invoices over network 207 to the card issuer for continuing education credit card transactions received over network 207 from merchants associated with the bank, and crediting those merchants' accounts for the amount of their transactions (less various fees).

Provider computer system 203A and associated database 203B comprise the computer systems of the continuing education course provider. Database 203B includes course information that a constituent can access over network 207 via, for example, a web browser on the constituent's web enabled device 206. One process that can execute on provider computer system 203A is transmitting over network 207 to card issuer computer system 201A course information that is stored in card issuer database 201B in association with a cardholder's account. Another process that can execute on provider computer system 203A is generating bills for continuing education courses in which the constituent has enrolled, and transmitting the bills over network 207 to organization computer system 205A.

Merchant POS system 204 comprises the systems and interfaces by which a merchant and constituent can generate a continuing education credit card transaction. These systems and interfaces include, by way of example, point-of-sale card swipe systems at a merchant's place of business, and other merchant-constituent interfaces by which the constituent can generate a credit card transaction, including Internet based online portals by which the constituent can purchase goods and services from the merchant. Continuing education credit card transactions are transmitted from merchant POS system 204 over network 207 to other entities in computer network 200 as desired.

Organization computer system 205A and associated database 205B comprise the computer systems of the organization of the constituent, insofar as they execute processes and contain information in relation to the provision of a continuing education credit card to the constituent by the card issuer. Processes that execute on organization computer system 205A can include receiving and paying charges from the provider, and approving or disapproving continuing education credit card debits for charges pertaining to provider courses.

Constituent web-enabled device 206 comprises the systems by which the constituent can access over network 207 pertinent data from the other entities of computer network 200. Such systems might include, by way of example, PCs, PDAs, and other wireless devices such as smart phones. The constituent may use web-enabled device 206, for example, to access course information in provider database 203B, or to receive and pay a continuing education credit card bill generated by card issuer computer system 201A. To permit operation of the web-enabled device 206, for example, computer systems 203A and 201A of the provider and of the card issuer include web servers accessible by the web-enabled device 206.

Figure 3:
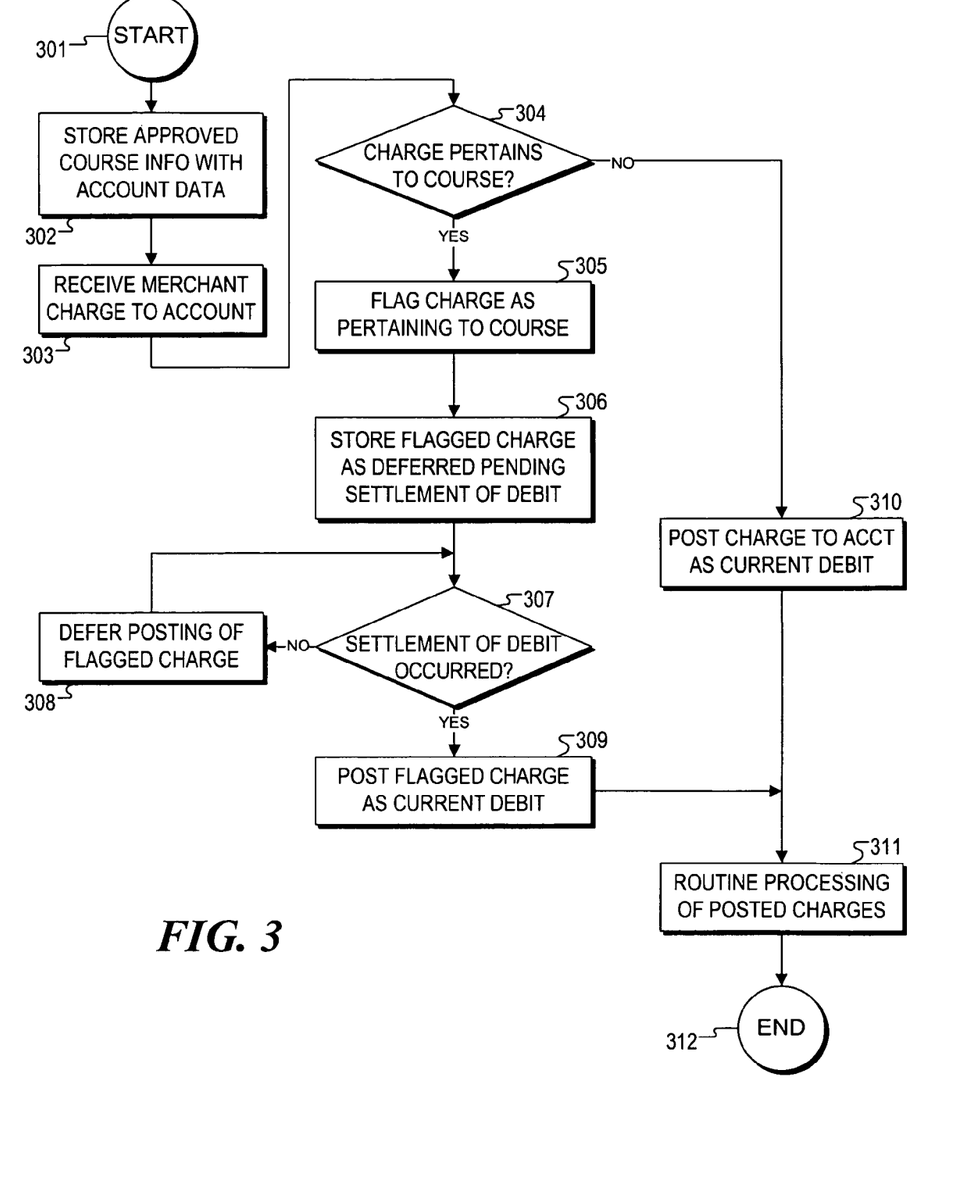
FIG. 3 is a flow chart of a computerized method for providing continuing education credit card services by a card issuer, in accordance with an embodiment of the present invention.

FIG. 3 is a flow chart of a computerized method for providing continuing education credit card services by a card issuer, in accordance with an embodiment of the present invention. In process 302, information related to a course for which the organization has given approval to the constituent for enrollment is stored in card issuer database 201B in association with constituent's continuing education credit card account. The stored information may be generated, for example, during a computerized approval process in organization computer system 205A in which the constituent submits a continuing education request, and upon organization approval of the request, the information to be stored is transmitted over network 207 to card issuer computer system 201A, and stored by the card issuer computer system 201A in card issuer database 201B in association with constituent's continuing education credit card account.

In operation, the information stored by the card issuer will at a minimum include a matrix of specifications by the organization of courses qualifying for funding. A course that meets these specifications is expected to qualify for funding. However, because the specifications may vary from one constituent level to another, there can be a further layer of customization associated with the information stored in process 302. Such customization may be provided by the organization on a constituent-specific basis, or alternatively the customization may be provided by a web-interface, for example, over which the constituent provides information. The constituent-provided information then permits the software of the card issuer to apply the specification of the organization in determining specifically the constituent's eligibility for funding. Alternatively, the specification may be supplied by the provider under an agreement with the organization to match constituents to courses qualifying for funding. In these embodiments, the approved course information stored in process 302, may also result from an approval request transmitted to the organization from provider computer system 203A when a constituent attempts to register for a course that does not currently qualify for funding.

In process 303, card issuer computer system 201A receives a merchant charge on the constituent's continuing education credit card account. This transaction is received by card issuer computer system 201A over network 207 from merchant POS system 204.

In process 304, a decision branch determines whether the transaction to the constituent's continuing education credit card account pertains to an approved course by comparing transaction information received in process 303 to course information stored in process 302. If decision branch process 304 determines that the charge to the constituent's account does not pertain to an approved course, then, in process 310, the charge is posted to the card account as a current debit. In process 311, the charge is processed and billed as a routine credit card charge.

If decision branch process 304 determines that the charge to the constituent's account does pertain to an approved course, then, in process 305, the charge transaction is flagged as pertaining to the course. In process 306, the flagged charge is stored as a debit in card issuer database 201B in association with constituent's account, and posting of the flagged debit will be deferred pending settlement of the debit.

In process 307, a decision branch periodically determines whether settlement of the flagged debit has occurred. If decision branch process 307 determines that settlement of the flagged debit has not yet occurred, then posting of the flagged debit will be deferred (in process 308) at least until the process of decision branch 307 again determines whether settlement of the flagged debit has occurred. If decision branch process 307 determines that settlement of the flagged debit has occurred, then, in process 309, the flagged charge is posted as a current debit. After the flagged charge is posted as a current debit, in process 311 the charge is processed and billed as a routine credit card charge.

Figure 4:
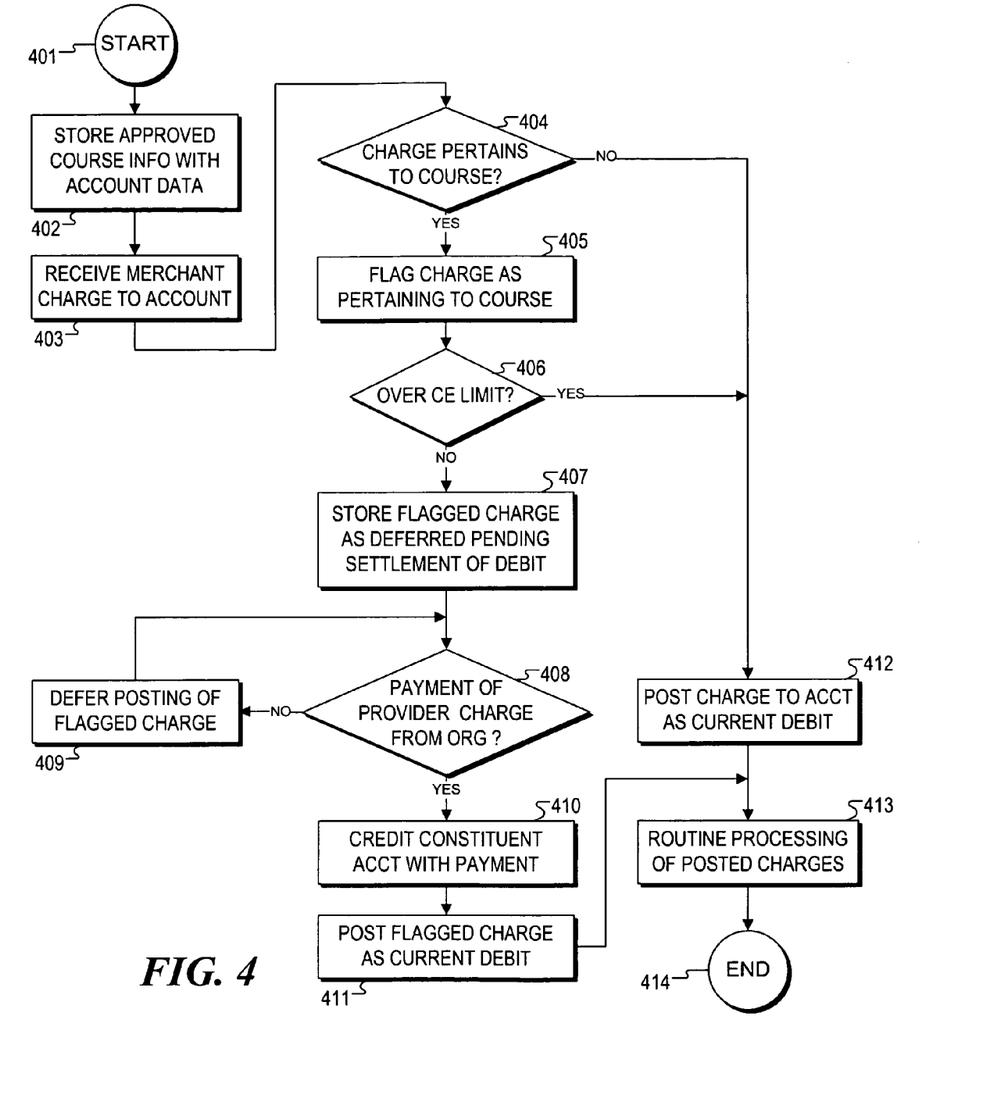
FIG. 4 is a flow chart of a computerized method, in accordance with an embodiment of the present invention, similar to that of FIG. 3, wherein additionally a continuing education funding limit is enforced by the card issuer.

FIG. 4 is a flow chart of a computerized method, in accordance with an embodiment of the present invention, similar to that of FIG. 3, wherein additionally a continuing education funding limit is enforced by the card issuer. This figure includes, among other things, new decision branch process 406 addressing whether the flagged charge is over a limit imposed by the organization (or the funding source if different) for funding of continuing education charges. In this process, after the continuing education credit card transaction has been flagged in process step 405 as pertaining to the course, it is determined whether the charge would exceed a limit for funding of charges. In one embodiment, the limit relates to the aggregate charges for continuing education. In this embodiment, decision branch process 406 determines whether adding the flagged charge amount to the current total of approved program charges would cause the new total to exceed a predetermined limit for funding. In another embodiment, the continuing education limit is alternatively or additionally based on the total number of courses (or course-hours) for which the constituent will receive funding. Decision branch process 406 thus determines whether storing the flagged charge would cause the total number of courses (or of course-hours) for which funding will be made to exceed the limit.

If decision branch process 406 determines that storing the flagged charge would cause the continuing education limit to be exceeded, then in process 412, the charge transaction is posted to the card account as a current debit, and in process 413, the charge is processed and billed as a routine credit card charge. Alternatively, if decision branch process 406 determines that storing the flagged charge would not cause the continuing education limit to be exceeded, then in process 407, the flagged charge is stored as a debit in card issuer database 201B in association with constituent's continuing education credit card account, and posting of the flagged debit will be deferred pending settlement of the debit.

In process 408, posting of the flagged charge as a current debit (in process 411) will continue (in process 409) until the card issuer has received payment for the provider charge associated with the approved course from the organization or other funding source. In this embodiment, the organization (or other funding source) receives a duplicate charge from the provider for the charge incurred on the continuing education credit card by the constituent when paying for the approved course.

After payment of the provider charge from the organization has been received by the card issuer, the issuer credits the continuing education credit card account of the constituent with the payment amount (in process 410), and in process 411, the flagged charge is posted as a current debit to the credit card account. In process 413, the charge is then processed and billed as a routine credit card charge.

Figure 5:
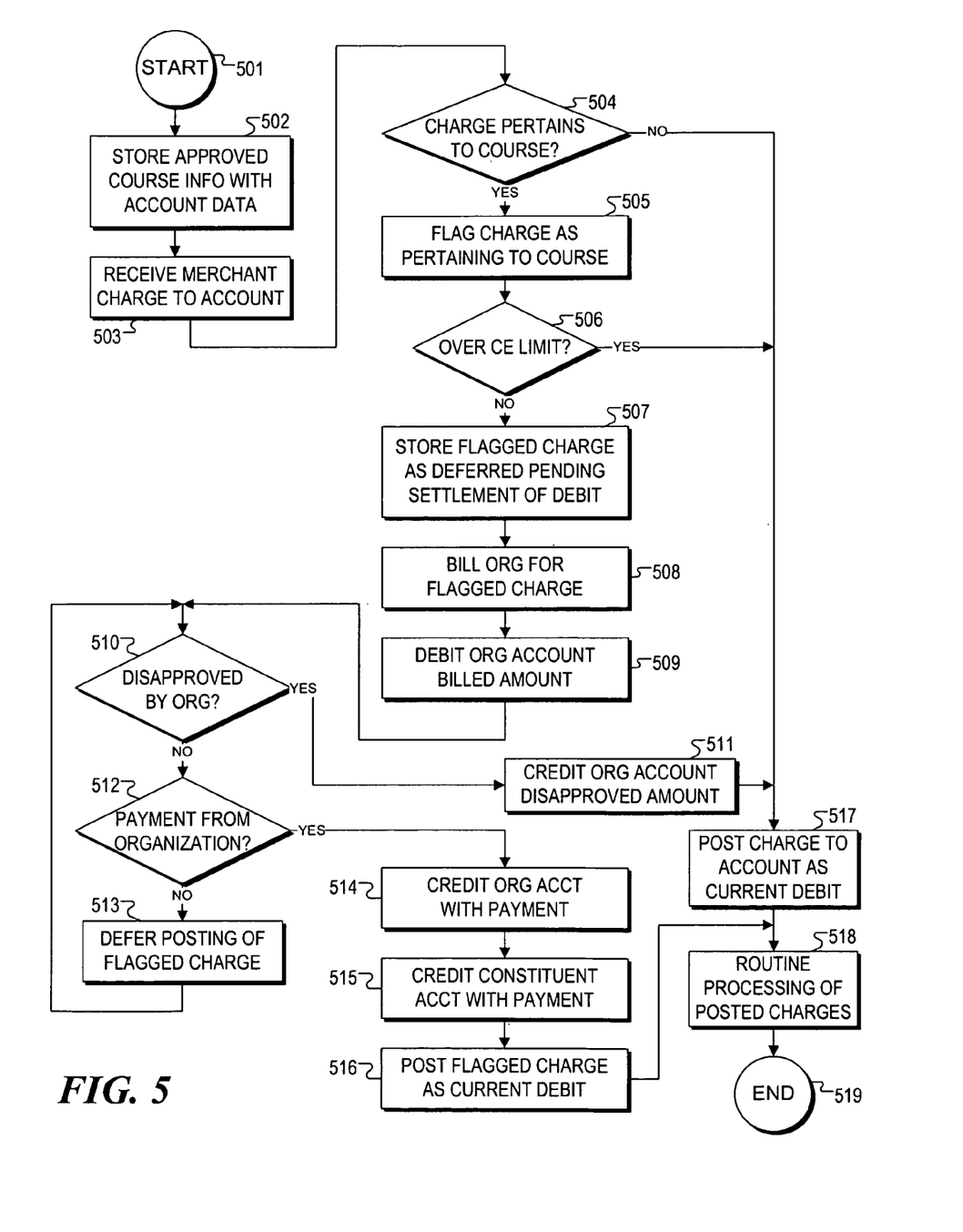
FIG. 5 is a flow chart of a computerized method, in accordance with an embodiment of the present invention, similar to that of FIG. 4, wherein additionally the card issuer employs a procedure for handling a refusal by the organization to fund the continuing education charge, and wherein the card issuer also handles billing of the organization for funding of the continuing education charge.

FIG. 5 is a flow chart of a computerized method, in accordance with an embodiment of the present invention, similar to that of FIG. 4, wherein additionally the card issuer employs a procedure for handling a refusal by the organization to fund the continuing education charge, and wherein the card issuer also handles billing of the organization for funding of the continuing education charge. This figure includes a new decision branch process 510 that allows for input from the organization to disapprove of a continuing education charge, in which case the charge will be posted as a current debit to the cardholder's account. The figure also includes a new series of processes, including processes 508, 509, and 514, in which a card issuer account of the organization is debited pending receipt of payment from the organization.

In this embodiment, the card issuer periodically bills the organization for the amount of the flagged charges (in process 508) after the flagged charges have been stored as deferred pending settlement (in process 507). In process 509, an account of the organization at the card issuer is debited for the amount billed. Decision branch process 510 then provides an opportunity for the card issuer to receive input from the organization as to whether flagged charges that have been billed to the organization (in process 508) are improper and should be disapproved. If the card issuer receives organization disapproval of a particular flagged charge (in process 510), then in process 511, the organization account that was debited the flagged charge (in process 509) is credited with the flagged charge amount, and in process 517, the flagged charge that was disapproved by the organization for payment is posted to the continuing education credit card account of the constituent as a current debit. In process 518, the charge is then processed and billed as a routine credit card charge.

In various embodiments, decision branch process 504 may operate such that a charge is determined to pertain to a course only when the course has been approved and course information has been stored in association with the credit card account (in step 502). In these embodiments, charges for courses that are not "pre-approved" will be passed by decision branch process 504 to processes 517 and 518, and will be processed and billed as a routine credit card charge. In other embodiments, decision branch process 504 may operate such that a charge is determined to pertain to a course for any charge for a provider course. In these embodiments, charges for provider courses for which there is no stored course information (see process 502) may be brought to the attention of the organization. The organization would then have the opportunity to disapprove the charge (in step 510). For charges for provider courses for which there is stored course information (see process 502), the organization would also have the opportunity to disapprove the charge (in step 510).

In decision branch process 510, if it is determined that the organization has not disapproved of the flagged charge, then in decision branch process 512, it is periodically determined whether the card issuer has received payment from the organization for the billed amount. If it is determined in process 512 that payment has not been received, then posting of the flagged charge as a current debit is deferred (in process 513) at least until decision branch process 510 is again periodically executed. If in decision branch process 512, it is determined that payment from the organization has been received, then in process 514, the organization account that was debited the billed amount (in process 509) is credited for the amount of the payment received.

Figure 6:
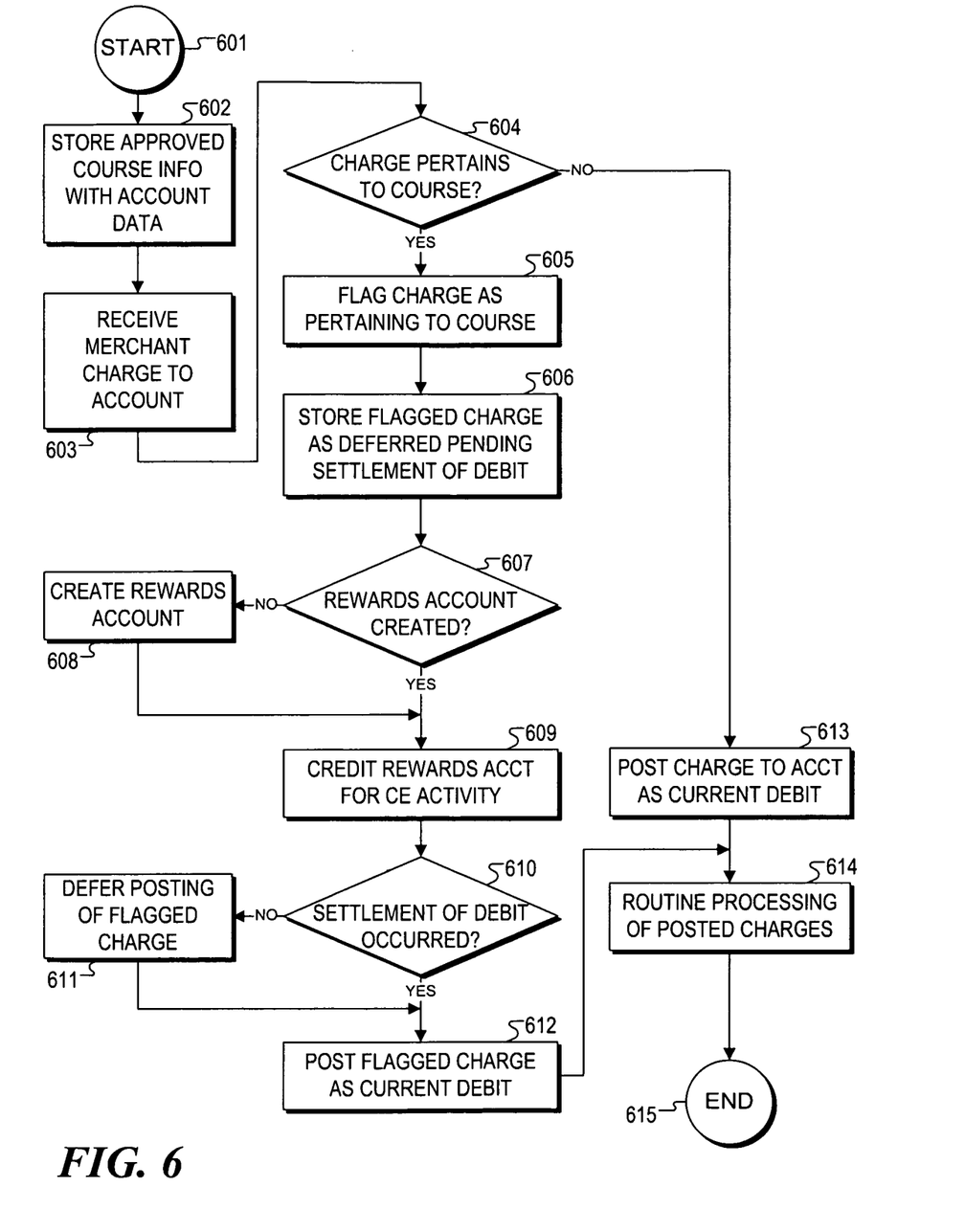
FIG. 6 is a flow chart of a computerized method in accordance with an embodiment of the present invention, similar to that of FIG. 3, wherein additionally the card issuer provides a rewards account to the constituent.

FIG. 6 is a flow chart of a computerized method in accordance with an embodiment of the present invention, similar to that of FIG. 3, wherein additionally the card issuer provides a reward account to the constituent. This figure includes a new series of processes, including processes 607-609, that create a reward account when the card issuer receives the first charge on a card account that pertains to a provider course, and credits the reward account for activity on the card that pertains to a provider course. In this embodiment, after a flagged charge has been stored (in process 606), decision branch process 607 determines whether there is a reward account associated with the continuing education credit card account. If no reward account is associated with the credit card account, then in process 608, a reward account is created. After a reward account has been created (in process 608), or if (in process 607) a reward account is already associated with the account, then in process 609, the reward account is credited by the card issuer based on the flagged continuing education transaction.

In various embodiments of the invention, the reward account is credited with "points" based on the amount of the charges flagged in process 605. In other embodiments, the reward account is credited based on the number of courses the constituent has charged on the credit card. Additionally, on request by the constituent to the card issuer, the reward points may be redeemed and applied against charge debits in the card account. The reward points may also be redeemed in an automated process in which points are automatically credited against account debits for transactions involving certain identified goods and services.

Figure 7:
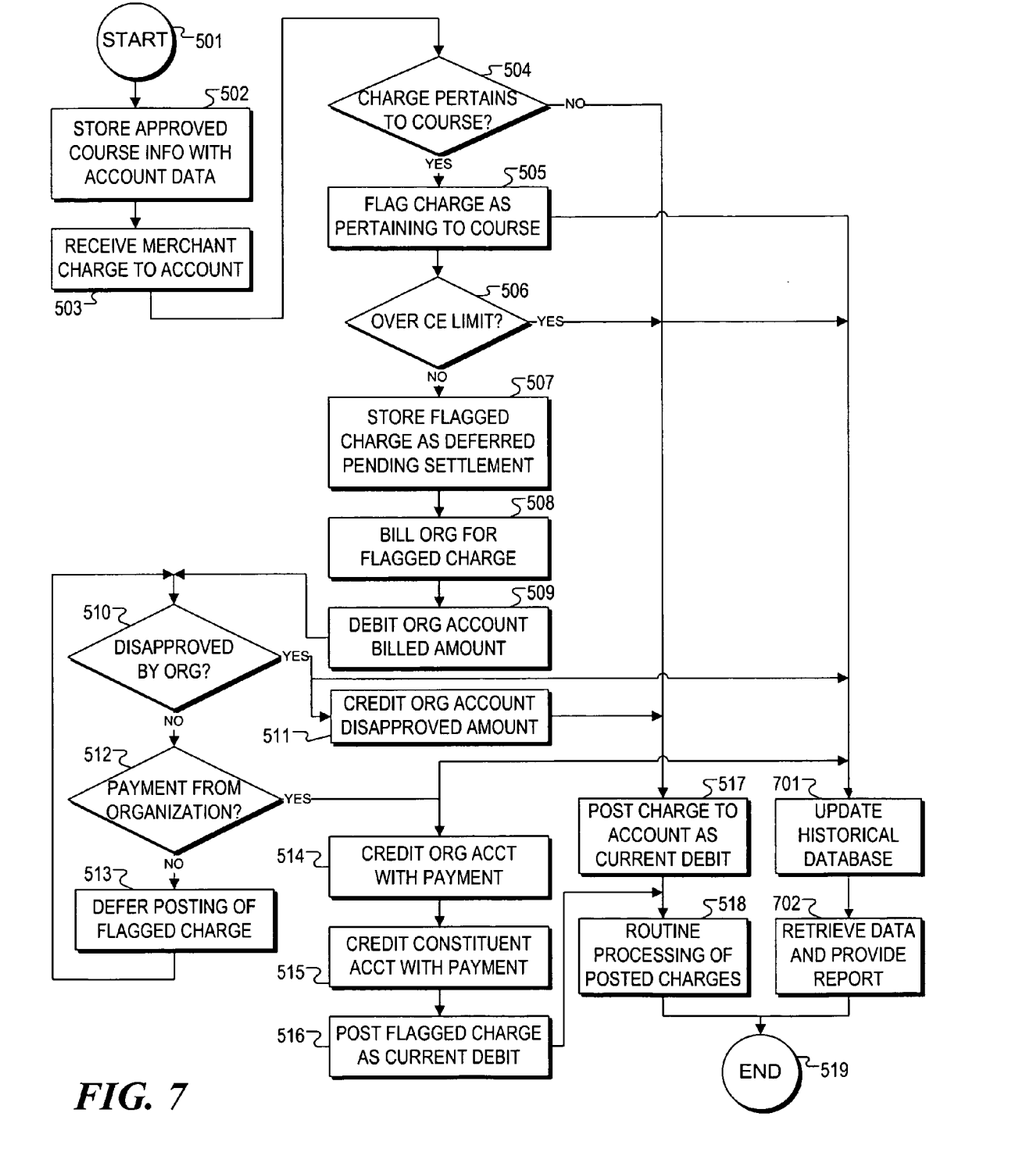
FIG. 7 is a flow chart of a computerized method, in accordance with an embodiment of the present invention, similar to that of FIG. 5, wherein additionally a historical database is maintained from which reports are provided to the constituent concerning continuing education activity of the constituent.

FIG. 7 is a flow chart of a computerized method, in accordance with an embodiment of the present invention, similar to that of FIG. 5, wherein additionally a historical database is maintained from which reports are provided to the constituent concerning continuing education activity of the constituent. In FIG. 7, the process of updating the historical database (in process 701) is triggered by any event that is material to continuing education activity of the constituent. As can be seen from the figure, representative events triggering updating of the historical database include flagging a charge as pertaining to the approved course in process 505, determining that a charge is over the CE limit in process 506, determining receipt a communication indicating disapproval of the course from the organization in process 510, and determining receipt of a payment from the organization in process 512. Process 702 includes retrieving information from the historical database pertinent to continuing education activity of the constituent and providing a report to the constituent. Providing the report optionally includes causing the retrieved information to be included in the bill, sent on a periodic basis to the constituent, by the card issuer—typically monthly—or providing the report on a recurrent basis to the constituent separate from the bill.

Figure 8:
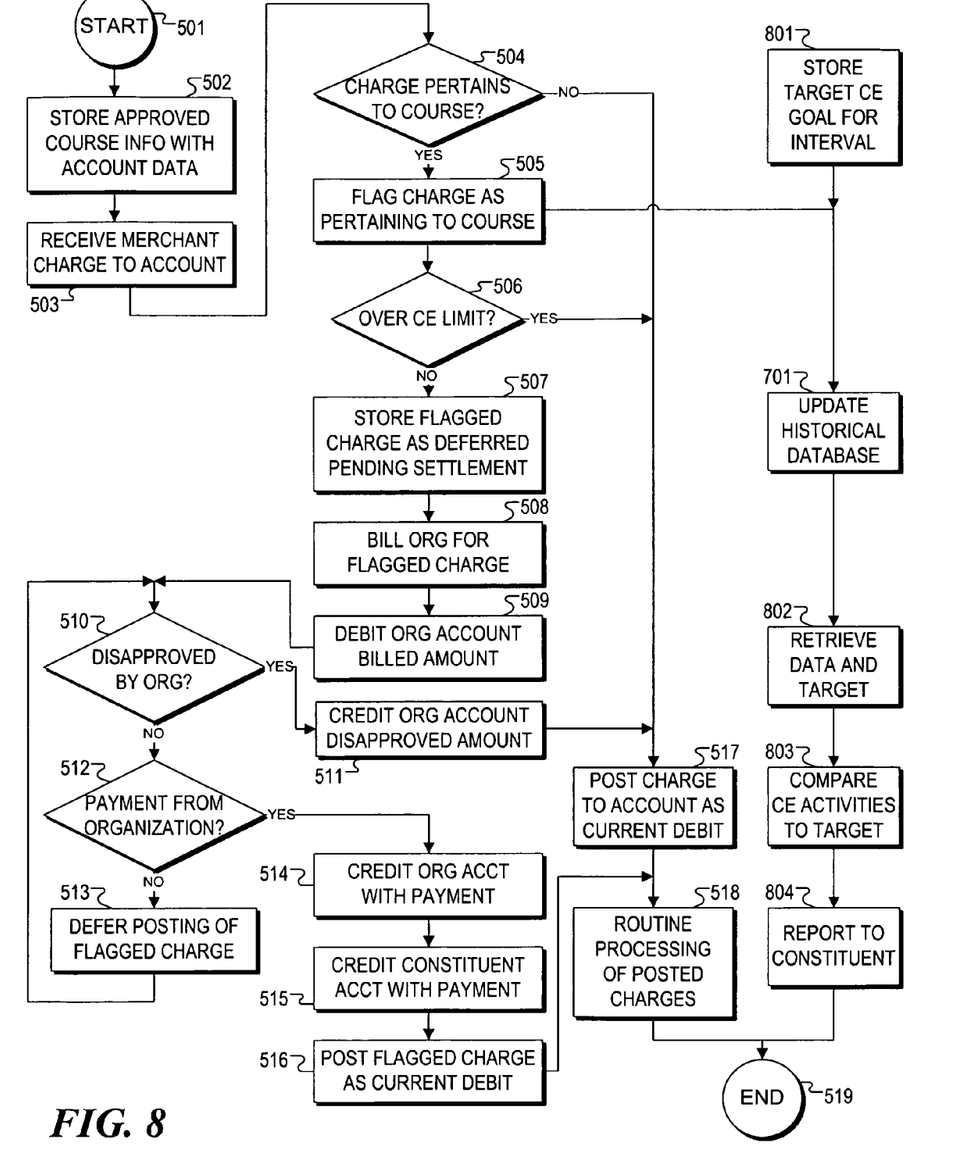
FIG. 8 is a flow chart of a computerized method, in accordance with an embodiment of the present invention, similar to that of FIG. 7, providing an alert to the constituent when continuing education activities over a relevant interval have fallen below a target goal.

FIG. 8 is a flow chart of a computerized method, in accordance with an embodiment of the present invention, similar to that of FIG. 7, providing an alert to the constituent when continuing education activities over a relevant interval have fallen below a target goal. In FIG. 8, process 801 stores a constituent target continuing education goal for a relevant interval, for example, quarterly, semi-annually, or an interval that is determined from the continuing education course schedule. On a recurring basis, data from the historical database (updated in process 701) pertaining to the constituent's continuing education activities are retrieved along with the target continuing education goal (in process 802). The constituent's continuing education activities to date in the interval are compared with the target (in process 803) to identify any shortfall (or, optionally, any excess over, or straight-on satisfaction of, the target) in such activity, and in process 804, the comparison is communicated to the constituent. In certain embodiments, the comparison of the constituent's activities to date in the interval with the target is communicated to the constituent via e-mail.

In practice, this embodiment may be implemented in a number of complementary ways. In one implementation, the constituent may receive reimbursement for continuing education program expenditures, and have a ceiling of $2,000, for example, for reimbursement in any given calendar year. In this implementation, the target continuing education goal is simply to enroll in continuing education courses that would consume the entire $2000 ceiling. In this implementation, the processes may be enhanced to mimic the processes previously described in connection with FIG. 7 (such as updating the historical database as a result of processes 506 and 510), so that the historical database has enough information to determine what level of continuing education activity by the constituent is necessary to consume reimbursement entitlements aggregating $2,000. Then the comparing process 803 can compare the $2,000 target with the total of reimbursable courses in the year to date in order to provide an alert to the constituent prior to the end of the calendar year if more courses are required to reach the target level. Additionally, a report can optionally be provided to indicate to the constituent that the continuing education activities have reached the target level or that they have exceeded it.

In another implementation, the target can be distinct from the level of continuing education activities necessary to consume reimbursement entitlements aggregating $2,000. In this implementation, the target may a number of continuing education classroom hours needed by the constituent in the current year (or over some other relevant interval) to obtain advancement or to maintain a certification The historical database in process 701 is updated with information needed for the comparing process of 803. Depending on the nature of the goal, such information may go beyond the information developed in process 505. For example, additional information about the course may be relevant, such as the number of classroom hours, and this information may be stored in the historical database with other information pertaining to the course. In such a case, in process 804, an alert may be sent to the constituent prior to the end of the relevant interval if more courses are required to reach the target level of classroom hours. Additionally, a report can optionally be provided to indicate to the constituent that the continuing education activities have reached the target level of classroom hours or that they have exceeded it.

We now address some of the intricacies of implementing various embodiments of the present invention, and refer to the example where the constituent is a nurse and the organization is her hospital employer. Assume that the nurse sees a course that is of interest to her (and thinks that it will be of value to her job performance). Will the charge for the course be reimbursable? In some cases the answer is crystal clear, such as the case of a nurse who deals with renal function taking a course in new dialysis equipment. In other cases, the course may be a requirement for employment (such as Infection Control). In other cases, reimbursement may be discretionary, but if the course description is worded clearly, one can often readily determine which courses qualify. These situations potentially affect the nature of process 302 described above in connection with FIG. 3. Even though that process is described above as conducted by the card issuer, in fact there can be more specific interaction with the organization by which the organization passes in advance on eligibility of each course in which the constituent seeks to enroll, and passes on specific eligibility information for the constituent. Then in process 302, the card issuer need only determine if the course for which the debit appears matches a course previously passed on to the card issuer by the organization. In the event of an adverse determination by the hospital, the nurse may be given a right to dispute the determination.

In an alternative embodiment, the nurse, having selected a course (and before charging her credit card for the course), may be required to get pre-approval for the course from her supervisor. While approval is often routine, money not used for CE course reimbursement typically goes back into the general hospital budget, so there is considerable incentive to avoid the reimbursement obligations. In this related embodiment, the card issuer system may provide a mechanism (for example using a web interface) for the nurse to have the card issuer system handle the pre-approval for the course.

In a prior art manual process associated with a nurse's seeking CE approval for a program, the nurse will show a brochure on the continuing education program to the superior. If, for example, the brochure relates to a cruise on which continuing education is offered, the superior will look at the information in the brochure, and if the program involves a trip that has the travel and meals broken out, the supervisor will correctly and routinely deny the travel and meals part. In contrast, in connection with an embodiment of the present invention, the card issuer system may implement a process in which the travel and meals portion of the cruise is excluded from the CE approval request. The travel and meals portion can be handled as a card issuer reward, as described above; alternatively, or in addition, the card can impose a fee that is adjusted to cover some or all of the reward cost.

Once the nurse gets the pre-approval from her supervisor for the course (or the card issuer gets it for her), the nurse charges the card and gets a receipt. The receipt is essential for reimbursement. This is a major holdup in CE because the nurse often does not have the money to make a direct expenditure for the CE course. However, the credit card, in accordance with an embodiment herein, provides an arrangement between the organization and the card issuer to place that money in a special account, in which the provider guarantees some of the repayment, since it is collecting the money. In fact, the arrangement with the provider can be implemented as a form factoring of its receivable from the nurse. The card issuer may pay some money to the provider to reduce its float and seek the reimbursement from the hospital. For example, the college gets half to cover its actual expenses, and the balance is paid after the card issuer collects from the hospital. The precise terms can be the subject of a negotiation between card issuer and the provider.

In this example, during the time the nurse submits her receipt and waits for the reimbursement, she pays no interest; that is another benefit of the card in an embodiment of the present invention. Meanwhile the provider relationship can be structured so that the provider waives interest while awaiting reimbursement from the hospital.

When the nurse receives the reimbursement, that money is turned over to the card issuer (either directly or indirectly) and the nurse and the provider are paid in full, while the card issuer covers the transportation and the meals as a reward. Independent of the transportation and meals, the card permits the nurse to delay outlay of money on an interest-free loan for payment of the course charge.

The card issuer provides an important record keeping function for the nurse in terms of the amount of CE credits the nurse gets, the amount of money she has left from her contract for reimbursement and certain other relevant data, which can be reported on her credit card bills. Even if all reimbursement requests have been refused, the information provided by the card issuer can be helpful to the nurse for income tax and professional recordkeeping purposes.

In embodiments of the present invention, the provider may be sufficiently secure in its position of reimbursement by the organization that the provider may choose to indemnify the nurse against liability to the employer if there is no reimbursement.

It should be noted that terms such as "server," "computer" and "computer system" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, embodiments of the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications will be apparent to those skilled in the art. The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive. All such variations and modifications are intended to be within the scope of the present invention as defined in any appended claims.

What is claimed is:

1. An improved computerized method for providing credit card services by a card issuer, such method being of the type employing computerized processing of a stream of incoming merchant charges to be posted and stored as debits to a cardholder's account and to generate a bill of the posted charges on a periodic basis to the cardholder, wherein the improvement operates in connection with continuing education offered to a constituent of an organization, the constituent having an account with the card issuer, and the improvement comprises:

storing in a first database on a first computer, in association with the account, data associated with a provider's course that is at least one of (i) approved and (ii) potentially approvable by the organization for enrollment by the constituent;

processing with a processor in the computer incoming merchant charges received over a network, said charges to be posted to the account, to flag any charge identified as pertaining to the approved course by the associated data and to store such charge as flagged;

conditioning settlement of such flagged charge on receiving authorization from the organization to implement settlement thereof, such authorization being evidence of satisfaction by the constituent of a requirement by the organization in relation to the course;

deferring billing of any flagged charge with the processor in the computer, pending settlement of such flagged charge under an arrangement with the organization, such settlement comprising using a settlement computer process and crediting of the account of the constituent with an amount corresponding to such flagged charge, and the billing of the flagged charge using a billing computer process in the computer to cause billing of the amount of such flagged charge to the constituent, providing to the constituent a reward system under which identified goods or services are made available without additional charge, conditioned, however, on existence of at least one flagged charge in the account, such providing including:

on storing a charge as flagged, crediting an associated reward account; and appropriately debiting the associated reward account on its use for the any of the identified goods or services;

in a second billing computer process, issuing a bill to the organization for each flagged charge, and debiting an account of the organization for an amount billed to the organization;

receiving from the organization payment of the bill to the organization, and, upon the settlement, crediting the account of the organization for such payment, such payment giving rise to the crediting of the account of the constituent;

wherein processing incoming merchant charges to be posted to the account to flag any charge identified as pertaining to the approved course further includes determining whether any such charge includes a portion that is not subject to funding, and in such case:

flagging only an amount of such charge excluding the portion; and separately processing the portion.

2. A method according to claim 1, further comprising:
upon settlement, receiving payment from the organization of a duplicate merchant charge issued by the provider to the organization, such payment giving rise to the crediting of the account of the constituent.

3. A method according to claim 1, wherein separately processing the portion includes posting the portion for current billing on the account of the constituent.

4. A method according to claim 1, wherein separately processing the portion includes absorbing the cost of the portion as a reward to the constituent.

5. A method according to claim 1, further comprising: on receipt of a communication from the organization corresponding to disapproval of the course, automatically removing the flag from the charge and posting it to the constituent's account for billing.

6. A method according to claim 1, further comprising: conditioning deferring billing of a flagged charge on whether the charge would exceed a limit imposed by the organization on charges pertaining to a provider's course.

7. A method according to claim 1, further comprising:
storing in a historical database a record of each flagged charge;
updating the historical database to reflect any posting of each such flagged charge, any payment thereof, any communication from the organization corresponding to disapproval of the course to which such flagged charge pertains, and whether any limit on continuing education of the constituent has been exceeded;
retrieving information from the historical database pertaining to the constituent; and
providing a report to the constituent based on the retrieved information so as to provide the constituent with a record of continuing education activity of the constituent.

8. A method according to claim 7, wherein providing the report includes providing it on a recurrent basis.

9. A method according to claim 7, wherein providing the report includes causing the retrieved information to be included in the bill on the periodic basis to the constituent.

10. A method according to claim 7, further comprising:
storing for the constituent a target continuing education goal for a relevant interval;
on a recurrent basis, retrieving from the historical database information pertaining to the constituent's continuing education activities to date in the relevant interval, comparing such activities with the target continuing education goal, identify performance of the constituent to date in relation to the target in such activities, to produce a comparison; and
causing communication of the comparison to the constituent.

11. A method according to claim 10, wherein causing communication to the constituent includes generating an e-mail to the constituent.

12. A method according to claim 10, wherein comparing such activities with the target continuing education goal, includes determining whether performance of the constituent to date results in any shortfall from the target, straight-on satisfaction of the target, or excess over the target.

13. A method according to claim 12, wherein causing communication to the constituent includes generating an e-mail to the constituent.

14. A method according to claim 1, further comprising:
storing in a historical database a record of each flagged charge;
storing for the constituent a target continuing education goal for a relevant interval;
on a recurrent basis, before expiration of the relevant interval, retrieving from the historical database information pertaining to the constituent's continuing education activities to date in the relevant interval, comparing such activities with the target continuing education goal, to identify any shortfall in such activities;
and in the event a shortfall has been identified, causing communication to the constituent of the shortfall to alert the constituent, so that the constituent has an opportunity to repair the shortfall before expiration of the relevant interval.

* * * * *